United States Patent

[11] 3,617,240

| [72] | Inventor | Herbert Fleming Scott, Jr.<br>Prince George, Va. |
|---|---|---|
| [21] | Appl. No. | 730,897 |
| [22] | Filed | May 21, 1968 |
| [45] | Patented | Nov. 2, 1971 |
| [73] | Assignee | Allied Chemical Corporation<br>New York, N.Y. |

[54] INHIBITION OF CORROSIVE ACTION OF AQUEOUS AMMONIUM NITRATE-UREA ON FERROUS METALS
1 Claim, No Drawings

[52] U.S. Cl.......................................................... 71/29, 71/30, 252/389
[51] Int. Cl........................................................ C05c 9/00
[50] Field of Search............................................ 71/28, 29, 50, 34, 30, 35; 252/389

[56] References Cited
UNITED STATES PATENTS

| 2,855,286 | 10/1958 | Harvey........................ | 71/29 |
|---|---|---|---|
| 3,067,024 | 12/1962 | Boies et al. .................. | 71/50 |
| 3,264,085 | 8/1966 | Hignett et al. ................ | 71/34 |

*Primary Examiner*—Reuben Friedman
*Assistant Examiner*—Charles N. Hart
*Attorney*—John J. Lipari ABSTRACT: Ferrous metal corrosion by an aqueous solution of ammonium nitrate and urea is inhibited by incorporating at least 0.02 percent $P_2O_5$, at least 30 percent of which is polymeric phosphate. Ammoniated superphosphoric acid is a source of the polymeric phosphates. The aqueous solution, which is useful as a soil fertilizer, has a pH of 6–7, contains at least 20 percent of each nitrogen ingredient, at least 15 percent water and up to 1 percent free ammonia.

INHIBITION OF CORROSIVE ACTION OF AQUEOUS AMMONIUM NITRATE-UREA ON FERROUS METALS

BACKGROUND OF THE INVENTION

This invention relates to aqueous ammonium nitrate-urea solutions; in particular, it relates to the inhibition of the corrosive action thereof on ferrous metals.

Aqueous ammonium nitrate-urea solutions have had wide use for some time as soil fertilizers. These solutions can be of any desired concentration; however, the solutions generally contain at least 20 percent of each nitrogen-containing component and at least 15 percent water. In some instances small amounts of free ammonia, say up to 1 percent may be present.

Aqueous ammonium nitrate-urea solutions containing little or no free ammonia exert a marked corrosive affect on ferrous metals which precludes storage or shipping of the solutions in ferrous containers and handling in ferrous lines, valves, and the like without damage to the ferrous metal.

U.S. Pat. No. 2,855,286 relates to a process for protecting both ferrous and aluminum metals against corrosion by aqueous solutions of ammonium nitrate containing little or no free ammonia, and which may contain urea or sodium nitrate in addition to the ammonium nitrate. This patent discloses incorporating in the aqueous ammonium nitrate solution 0.02 percent to 2 percent $P_2O_5$ in the form of a soluble phosphate to protect ferrous and aluminum metals against corrosion. $P_2O_5$ compounds mentioned include the free phosphoric acids (hydrogen phosphates) and the phosphate salts (as ortho, meta or pyro compounds) soluble to the degree required in the ammonium nitrate solutions.

Although the teachings of U.S. Pat. No. 2,855,286 are an important advance in the art, research in this field has continued in an effort to find still better corrosion inhibitors. Ideally, a corrosion inhibitor should substantially eliminate corrosion; if should be relatively low in cost and should be effective at low concentration; it should be in liquid form for easy mixing with the fertilizer solution; and it should be capable of being easily shipped and stored prior to its use. Inhibitors commonly used heretofore did not have these and other requirements which are satisfied by the inhibitors of this invention.

SUMMARY OF THE INVENTION

In accordance with the instant invention, corrosion of ferrow metals, such as mild and carbon steel, by aqueous solutions of ammonium nitrate and urea is effectively inhibited by incorporating in the solution a corrosion-inhibiting amount of $P_2O_5$, at least about 30 percent of which by weight is in the form of polymeric phosphates. Ammoniated superphosphoric acid is the preferred source of this $P_2P_5$, and is normally added in an amount to provide at least about 0.02 percent $P_2O_5$ by weight.

Although the invention may be applied to aqueous ammonium nitrate-urea solutions of any relative concentrations, with or without small amounts of free ammonia present, preferred solutions are those normally used as soil fertilizers or in the production of fertilizers, i.e., those solutions of pH 6-7 containing on a weight basis at least about 20 percent each of ammonium nitrate and urea, at least about 15 percent of water, and 0-1 percent of free ammonia.

DETAILED DESCRIPTION OF THE INVENTION

The $P_2O_5$ of use in the instant invention, which contains at least 30 percent by weight of polymeric phosphates, is added to the aqueous solutions of ammonium nitrate and urea in the form of ammoniated superphosphoric acid. This latter material can be produced by evaporating practically all the water from aqueous orthophosphoric acid to form superphosphoric acid containing 70-77 percent $P_2O_5$, which is then ammoniated with aqueous ammonia. The aqueous ammoniated superphosphoric acid will normally have the following properties: pH of from about 5 to 8, preferably about 6; a nitrogen content of from about 9 percent to 12 percent by weight, preferably from about 10 percent to 11 percent by weight and a total phosphorus content measured as $P_2O_5$ of from about 28 percent to 39 percent by weight, preferably about 34 percent to 38 percent by weight wherein polymeric phosphates represent from about 30 percent to 70 percent by weight, preferably from about 50 percent to 65 percent by weight, based on the weight of the total phosphorus content. The polymeric phosphates include pyrophosphates and polyphosphates. Of course, the use of ammoniated superphosphoric acids with properties somewhat outside of these ranges is within the scope of the instant invention.

The ammoniated superphosphoric acid is added to the aqueous solution of ammonium nitrate and urea in an amount to provide an effective corrosion-inhibiting level of $P_2O_5$ in the solution. Normally, a $P_2O_5$ level of at least about 0.02 percent by weight will be used although lower levels may be employed if less effective inhibition is acceptable. Levels as high as about 0.07 percent and even higher are effective, although levels in excess of about 0.07 percent will usually not be used for economic reasons. Levels between about 0.03 percent and 0.04 percent are preferred. These low levels of $P_2O_5$ containing the required polymeric phosphates have been found to inhibit corrosion more effectively than high levels of other materials used heretofore.

In addition to the high level of inhibition which is possible by its use, $P_2O_5$ from ammoniated superphosphoric acid is advantageous for several other reasons. It does not significantly change the pH of the ammonium nitrate-urea solution, which is preferably in the range of 6-7; a lower pH tends to intensify corrosion of carbon steel and a higher pH may cause decomposition of the urea accompanied by loss of free ammonia. In addition, free ammonia may damage plants during direct application of the solution to the soil. Also, the inhibitor of this invention is not toxic to plants or animals and is itself a plant food. Furthermore, the novel inhibitor is not corrosive and may be shipped or stored in mild steel prior to use.

A commercially available aqueous ammoniated superphosphoric acid having the following properties was found to be particularly useful for purposes of the instant invention, and will be referred to as "Solution A" in the examples following hereinafter:

| | |
|---|---|
| Nitrogen | 10.1% by weight |
| Phosphorus (as $P_2O_5$) | 34.2% by weight |
| Sulfate Ion | 1.7% by weight |
| Trace Minerals | |
|     Iron ($Fe_2O_3$) | ca. 1.0% by weight |
|     Calcium (CaO) | ca. 0.1% by weight |
| pH | 6.0 |
| Specific gravity at 60° F. | 1.4 |
| Salting out Temperature | 0° F. |
| Distribution of Ammonium Phosphates | |
|     Orthophosphate | 46% of total $P_2O_5$ |
|     Polyphosphate | 54% of total $P_2O_5$ |

Eleven solutions of aqueous ammonium nitrate-urea were prepared based on a solution consisting of 45.1 percent ammonium nitrate, 34.8 percent urea and 20.1 percent water. Inhibitors used were Solution A and reagent grade $H_3PO_4$, 85 weight percent.

| Solution Number | Inhibitor | Total Inhibitor % | Equivalent $P_2O_5$, % |
|---|---|---|---|
| 1 | None | None | — |
| 2 | $H_3PO_4$, 85% | 0.059 | 0.036 |
| 3 | $H_3PO_4$, 85% | 0.090 | 0.055 |
| 4 | Solution A | 1.00 | 0.342 |
| 5 | Solution A | 0.50 | 0.171 |
| 6 | Solution A | 0.16 | 0.055 |
| 7 | Solution A | 0.10 | 0.034 |
| 8 | Solution A | 0.20 | 0.068 |
| 9 | Solution A | 0.30 | 0.102 |

| | | | |
|---|---|---|---|
| 10 | Solution A | 0.157 | 0.053 |
| 11 | Solution A | 0.07 | 0.024 |

Inhibited solutions for each example were prepared from the ammonium nitrate-urea solution by admixing the inhibitor just prior to each series of corrosion tests.

The following examples are provided to more fully illustrate the instant invention. They are provided for illustrative purposes only and are not be construed as limiting the invention, which is defined by the appended claims.

EXAMPLE 1

$H_3PO_4$ 4.4   7.6   8.0

Specimens of carbon steel, ASTM A-285 Grade B, were ground to a 240 grit finish, measured, cleaned with brush and scouring powder, rinsed with water, rinsed with acetone, dried, weighted and immersed in duplicate in Solutions 1, 2, 11, 4, 5 and 6 at room temperature. At the end of the contact time with the Solutions, the specimens were cleaned with a fiber brush and scouring powder, rinsed with water, rinsed with acetone, dried, and weighted. Average corrosion penetration rates in mils per year were calculated from the weight loss of the specimens. Table I shows the relative corrosiveness of these fertilizer solutions to carbon steel.

TABLE I

| | Inhibitor, wt. percent | Contact time, days | Initial pH | Penetration, m.p.y. | Equivalent $P_2O_5$, wt. percent |
|---|---|---|---|---|---|
| Solution Number: | | | | | |
| 1 | None | 7 | 6.8 | 45.3 | None |
| 2 | $H_3PO_4$ (85%), 0.059 | 4 | 4.8 | 4.8 | 0.036 |
| 4 | Solution A, 1.00 | 7 | 6.1 | 0.2 | 0.342 |
| 5 | Solution A, 0.50 | 7 | 6.3 | 0.3 | 0.171 |
| 6 | Solution A, 0.16 | 7 | 6.6 | 0.2 | 0.055 |
| 11 | Solution A, 0.07 | 14 | | 3.1 | 0.024 |

EXAMPLE II

The procedure for Example I was followed except that carbon steel specimens were contacted with Solutions 1, 7, 8 and 9 for 32 days at room temperature. Results were as follows:

TABLE II

| Solution Number | Solution A, Weight % | Initial pH | Penetration mpy | $P_2O_5$ Weight % |
|---|---|---|---|---|
| 1 | None | 6.8 | 55.3 | None |
| 7 | 0.10 | 6.6 | 0.1 | 0.034 |
| 8 | 0.20 | 6.5 | 0.2 | 0.068 |
| 9 | 0.30 | 6.5 | 0.0 | 0.102 |

EXAMPLE III

Two sets of duplicate carbon steel specimens, prepared as described in example I were activated by contacting with 18 weight percent HCl solution for 10 seconds, rinsed in water for 3 seconds, then one set was immersed in Solution 3 and the other set in solution 10. The average surface area of each specimen in solution 3 was 14.05 cm.$^2$. In solution 10 the average surface area of each specimen was 14.07 cm.$^2$. Both solutions contained about 0.053 percent $P_2O_5$. The bottles containing the test solutions and specimens were capped and placed side by side on a laboratory shelf for 30 days after which the specimens were cleaned, dried, and weighed as in example I. Average corrosion penetration rates were as follows:

TABLE III

| Solution Number | Inhibitor | Initial pH | After test pH | Penetration mpy |
|---|---|---|---|---|
| 3 | | | | |
| 10 | Solution A | 6.7 | 6.9 | 0.1 |

Appearance of rusty precipitate in solution 3 during the 30-day contact time was further evidence of corrosion. Solution 10 remained clear and free of rusty precipitate. Additional evidence of reaction between solution 3 and the steel is shown by the large shift in pH during the 30-day period.

EXAMPLE IV

An apparatus consisting of a stainless steel centrifugal pump and a glass circulation loop with temperature controls was constructed for the purpose of determining the corrosivity of ammonium nitrate-urea fertilizer solutions at a flow velocity of 6 feet per second. Carbon steel specimens were prepared in the same manner as described in example I except that they were activated by contacting with 18 percent HCl solution for 10 seconds, rinsed with water, and immediately supported on

TABLE IV

| | Equivalent $P_2O_5$ wt. % | Inhibitor | Velocity ft./sec. | Initial pH | Penetration m.p.y. |
|---|---|---|---|---|---|
| Solution number: | | | | | |
| 1 | None | None | 6 | 6.8 | 235.0 |
| 7 | 0.034 | Solution A | 6 | 6.7 | 1.4 | glass hangers and contacted with solution 1 in a long, straight, vertical section of the circulation loop. The test apparatus was then completely filled with Solution 1 and the pump was started. Contact was for 4 days at 6 feet per second and 34° C. This procedure was repeated for Solution 7. Average corrosion penetration rates see table IV.

I claim:

1. A process for inhibiting corrosion of ferrous metals contacted by a flowing aqueous solution of ammonium nitrate and urea having a velocity of at least about 6 feet per second, said solution containing about 45 percent by weight ammonium nitrate and about 34 percent by weight urea, which comprises incorporating in said solution about 0.034 percent by weight of $P_2O_5$ in the form of an aqueous ammoniated superphosphoric acid derived from wet-process phosphoric acid and having a 6.2 of about 6.2, a nitrogen content of about 10-11 percent by weight and a total phosphorus content measured as $P_2O_5$ of about 34-38 percent by weight, said total phosphates containing about 50-65 percent polymeric phosphates.

PO-1050
(5/69)

UNITED STATES PATENT OFFICE
CERTIFICATE OF CORRECTION

Patent No. 3,617,240        Dated November 2, 1971

Inventor(s) Herbert Fleming Scott, Jr.

It is certified that error appears in the above-identified patent and that said Letters Patent are hereby corrected as shown below:

Column 3, line 13, starting with "$H_3PO_4$" should appear in column 4, line 12 in Table III.

Column 3, line 17, "weighted" should be --weighed--.

Column 3, line 21, "weighted" should be --weighed--.

Claim 1, line 66, column 4, "6.2 of about 6.2," should read --pH of about 6.2,--.

Signed and sealed this 18th day of April 1972.

(SEAL)
Attest:

EDWARD M. FLETCHER, JR.      ROBERT GOTTSCHALK
Attesting Officer             Commissioner of Patents